US012632358B2

(12) United States Patent
Ahuja et al.

(10) Patent No.: US 12,632,358 B2
(45) Date of Patent: May 19, 2026

(54) UTILIZING DIGITAL TWINS FOR DATA-DRIVEN RISK IDENTIFICATION AND ROOT CAUSE ANALYSIS OF A DISTRIBUTED AND HETEROGENEOUS SYSTEM

(71) Applicant: Accenture Global Solutions Limited, Dublin (IE)

(72) Inventors: Manish Ahuja, Bengaluru (IN); Kanchanjot Kaur Phokela, New Delhi (IN); Swapnajeet Gon Choudhury, Bangalore (IN); Kapil Singi, Bangalore (IN); Kuntal Dey, Birbhum (IN); Vikrant Kaulgud, Pune (IN); Mahesh Venkataraman, Bangalore (IN); Mallika Fernandes, Bangalore (IN); Reuben Rajan George, Enathu (IN); Teresa Sheausan Tung, Los Angeles, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 853 days.

(21) Appl. No.: 17/990,395

(22) Filed: Nov. 18, 2022

(65) Prior Publication Data

US 2024/0168857 A1 May 23, 2024

(51) Int. Cl.
*G06F 11/34* (2006.01)
*G06F 9/50* (2006.01)
*G06F 11/07* (2006.01)

(52) U.S. Cl.
CPC ........ *G06F 11/3409* (2013.01); *G06F 9/5072* (2013.01); *G06F 11/079* (2013.01)

(58) Field of Classification Search
CPC .... G06F 11/34; G06F 11/3409; G06F 9/5072; G06F 11/079
USPC .......................................................... 703/6
See application file for complete search history.

(56) References Cited

U.S. PATENT DOCUMENTS 9,497,071 B2  11/2016 Gates et al.
2007/0124113 A1  5/2007 Foslien et al.
(Continued)

FOREIGN PATENT DOCUMENTS

CN  105740084 B  8/2018
CN  106130809 B  6/2019

OTHER PUBLICATIONS

Poltronieri et al., "ChaosTwin: A Chaos Engineering and Digital Twin Approach for the Design of Resilient IT Services," https://ieeexplore.ieee.org/abstract/document/9615519, 2021 17th International Conference on Network and Service Management (CNSM), (2021) pp. 234-238.
(Continued)

*Primary Examiner* — Andrew Joseph Rudy
(74) *Attorney, Agent, or Firm* — Mannava & Kang, P.C.

(57) ABSTRACT

A device may receive system data identifying computational components and software components of a distributed and heterogeneous system executing a hybrid cloud application, and may create digital twins for the computational components and the software components. The device may create a central digital twin to receive functional data, operational data, and key performance indicators (KPIs) from the digital twins, and may create complex KPIs based on the functional data, the operational data, and the KPIs. The device may modify, based on the complex KPIs, one or more of the digital twins to generate additional KPIs, and process the additional KPIs, with a principal component analysis model and a self-organizing maps model, to detect anomalies in the distributed and heterogeneous system. The device may generate, based on the anomalies, a KPI cause vector identifying a root cause associated with the anomalies, and may perform actions based on the root cause.

20 Claims, 11 Drawing Sheets

(56)                   References Cited

U.S. PATENT DOCUMENTS

| | | | |
|---|---|---|---|
| 2023/0135882 A1 * | 5/2023 | Cella | ..................... G06Q 30/06 |
| | | | 702/188 |
| 2023/0176557 A1 * | 6/2023 | Cella | ................... G05B 13/048 |
| | | | 700/117 |
| 2023/0274049 A1 * | 8/2023 | Perumalla | ............... G06F 30/20 |
| | | | 703/6 |
| 2026/0037824 A1 * | 2/2026 | Vandikas | ............... G06N 3/096 |

OTHER PUBLICATIONS

Dang et al., "Cloud-Based Digital Twinning for Structural Health Monitoring Using Deep Learning," https://ieeexplore.ieee.org/abstract/document/9547763, Sep. 24, 2021, pp. 3820-3830.

Bidush Kumar Sahoo et al., "Factors Affecting Fault Tolerance during Load Balancing in Cloud Computing," https://turcomat.org/index.php/turkbilmat/article/download/6079/6302/14437, Turkish Journal of Computer and Mathematics Education vol. 12 No. 11 (2021), pp. 1523-1533.

Josefsson, "Root-cause analysis through machine learning in the cloud," https://uu.diva-portal.org/smash/get/diva2:1178780/FULLTEXT01.pdf, Nov. 2017, 45 pages.

Dean et al., "UBL: Unsupervised Behavior Learning for Predicting Performance Anomalies in Virtualized Cloud Systems, "http://citeseerx.ist.psu.edu/viewdoc/summary?doi=10.1.1.403.5377, ICAC '12: Proceedings of the 9th International conference on Autonomic computing, Sep. 2012, pp. 191-200.

Soldani et al., "Anomaly Detection and Failure Root Cause Analysis in (Micro) Service-Based Cloud Applications: A Survey," https://dl.acm.org/doi/abs/10.1145/3501297, Feb. 3, 2022, 36 pages.

* cited by examiner

125

Modify, based on the complex KPIs, one or more of the digital twins to generate additional KPIs

100

135

Process the additional KPIs, with a trained self-organizing maps model, to detect one or more second anomalies in the distributed and heterogeneous system Second anomalies Central digital twin Additional KPIs Application system

100

Reconfigure a load balancer and an auto scaler associated with the distributed and heterogeneous system Correct a network slowdown associated with the distributed and heterogeneous system Correct network errors associated with the distributed and heterogeneous system Correct a software issue of an edge device associated with the distributed and heterogeneous system Correct a software issue of a cloud device associated with the distributed and heterogeneous system

145
Perform one or more actions based on the root cause

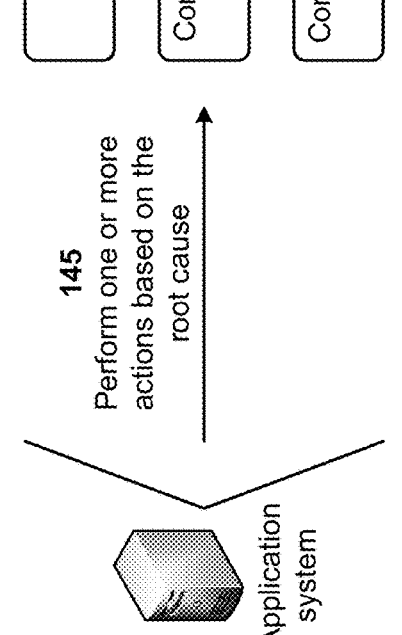

Application system

FIG. 1H

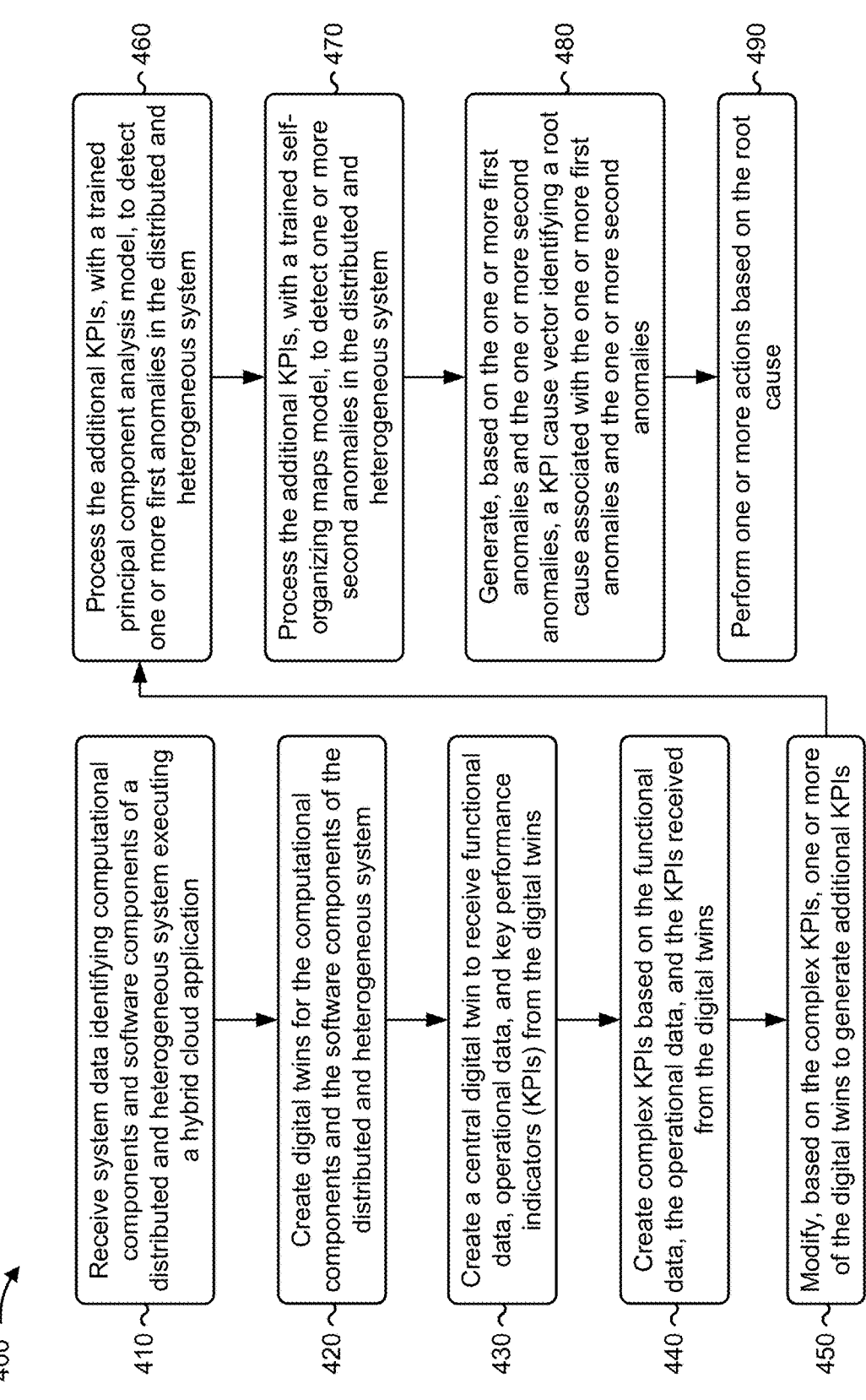

400

410 — Receive system data identifying computational components and software components of a distributed and heterogeneous system executing a hybrid cloud application 420 — Create digital twins for the computational components and the software components of the distributed and heterogeneous system 430 — Create a central digital twin to receive functional data, operational data, and key performance indicators (KPIs) from the digital twins 440 — Create complex KPIs based on the functional data, the operational data, and the KPIs received from the digital twins 450 — Modify, based on the complex KPIs, one or more of the digital twins to generate additional KPIs 460 — Process the additional KPIs, with a trained principal component analysis model, to detect one or more first anomalies in the distributed and heterogeneous system 470 — Process the additional KPIs, with a trained self-organizing maps model, to detect one or more second anomalies in the distributed and heterogeneous system 480 — Generate, based on the one or more first anomalies and the one or more second anomalies, a KPI cause vector identifying a root cause associated with the one or more first anomalies and the one or more second anomalies 490 — Perform one or more actions based on the root cause

FIG. 4

UTILIZING DIGITAL TWINS FOR DATA-DRIVEN RISK IDENTIFICATION AND ROOT CAUSE ANALYSIS OF A DISTRIBUTED AND HETEROGENEOUS SYSTEM

BACKGROUND

A digital twin is a virtual representation that serves as a real-time digital counterpart of a physical object or process. A digital twin may represent a physical asset, such as a computational component, a software component, an infrastructure, a process, and a service, in a digital world through timely collection of data and simulators for real-time monitoring, prediction, inference, optimization, and improved policy optimizations.

SUMMARY

Some implementations described herein relate to a method. The method may include receiving system data identifying computational components and software components of a distributed and heterogeneous system executing a hybrid cloud application, and creating digital twins for the computational components and the software components of the distributed and heterogeneous system. The method may include creating a central digital twin to receive functional data, operational data, and key performance indicators (KPIs) from the digital twins, and creating, via the central digital twin, complex KPIs based on the functional data, the operational data, and the KPIs received from the digital twins. The method may include modifying, via the central digital twin and based on the complex KPIs, one or more of the digital twins to generate additional KPIs, and processing, via the central digital twin, the additional KPIs, with a trained principal component analysis model, to detect one or more first anomalies in the distributed and heterogeneous system. The method may include processing, via the central digital twin, the additional KPIs, with a trained self-organizing maps model, to detect one or more second anomalies in the distributed and heterogeneous system, and generating, via the central digital twin and based on the one or more first anomalies and the one or more second anomalies, a KPI cause vector identifying a root cause associated with the one or more first anomalies and the one or more second anomalies. The method may include performing one or more actions based on the root cause.

Some implementations described herein relate to a device. The device may include one or more memories and one or more processors coupled to the one or more memories. The one or more processors may be configured to receive system data identifying computational components and software components of a distributed and heterogeneous system executing a hybrid cloud application, and create digital twins for the computational components and the software components of the distributed and heterogeneous system. The one or more processors may be configured to create a central digital twin to receive, via the central digital twin, functional data, operational data, and KPIs from the digital twins, and create, via the central digital twin, complex KPIs based on the functional data, the operational data, and the KPIs received from the digital twins. The one or more processors may be configured to modify, via the central digital twin and based on the complex KPIs, one or more of the digital twins to generate additional KPIs, and process, via the central digital twin, the additional KPIs, with a trained principal component analysis model, to detect one or more first anomalies in the distributed and heterogeneous system. The one or more processors may be configured to process, via the central digital twin, the additional KPIs, with a trained self-organizing maps model, to detect one or more second anomalies in the distributed and heterogeneous system, and generate, via the central digital twin and based on the one or more first anomalies and the one or more second anomalies, a KPI cause vector identifying a root cause associated with the one or more first anomalies and the one or more second anomalies. The one or more processors may be configured to perform one or more actions based on the root cause.

Some implementations described herein relate to a non-transitory computer-readable medium that stores a set of instructions for a device. The set of instructions, when executed by one or more processors of the device, may cause the device to receive system data identifying computational components and software components of a distributed and heterogeneous system executing a hybrid cloud application, and create digital twins for the computational components and the software components of the distributed and heterogeneous system. The set of instructions, when executed by one or more processors of the device, may cause the device to create a central digital twin to receive functional data, operational data, and KPIs from the digital twins, and create, via the central digital twin, complex KPIs based on the functional data, the operational data, and the KPIs received from the digital twins. The set of instructions, when executed by one or more processors of the device, may cause the device to modify, via the central digital twin and based on the complex KPIs, one or more of the digital twins to generate additional KPIs, and process, via the central digital twin, the additional KPIs, with a trained principal component analysis model, to detect one or more first anomalies in the distributed and heterogeneous system. The set of instructions, when executed by one or more processors of the device, may cause the device to process, via the central digital twin, the additional KPIs, with a trained self-organizing maps model, to detect one or more second anomalies in the distributed and heterogeneous system, and generate, via the central digital twin and based on the one or more first anomalies and the one or more second anomalies, a KPI cause vector identifying a root cause associated with the one or more first anomalies and the one or more second anomalies. The set of instructions, when executed by one or more processors of the device, may cause the device to perform one or more actions based on the root cause.

BRIEF DESCRIPTION OF THE DRAWINGS

FIGS. 1A-1H are diagrams of an example implementation described herein.

FIG. 4 is a flowchart of an example process for utilizing digital twins for data-driven risk identification and root cause analysis of a distributed and heterogeneous system.

DETAILED DESCRIPTION

Figure 1A:
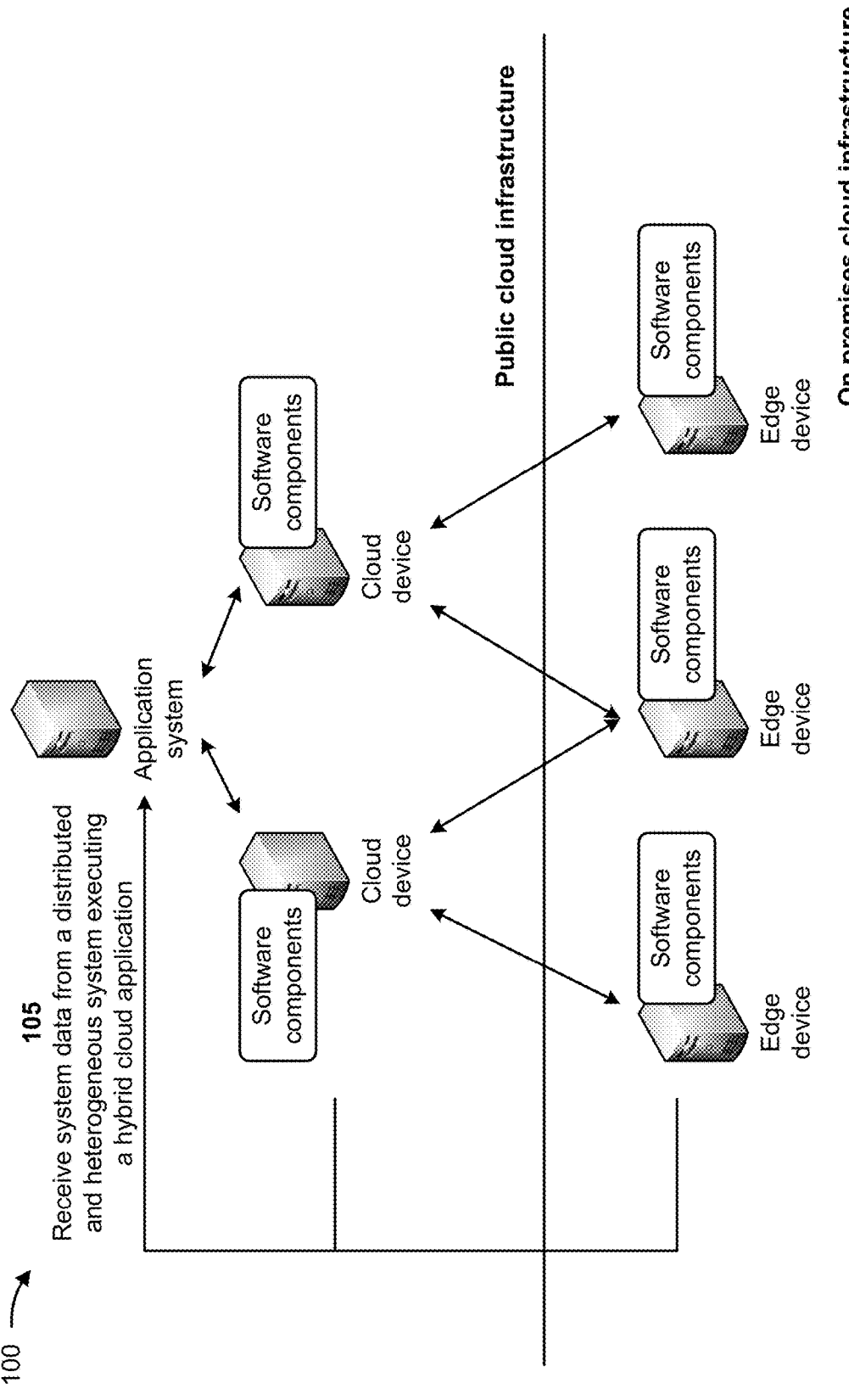

The following detailed description of example implementations refers to the accompanying drawings. The same reference numbers in different drawings may identify the same or similar elements.

A distributed and heterogeneous computation system may execute a hybrid cloud application in which different software components/services that constitute the hybrid cloud application are spread over two or more different computational components (e.g., are distributed). A significant quantity (e.g., more than 80%) of cloud computing environment failures are structural in nature, but appear to be functional failures. Primary causes of downtime in a cloud computing environment include network failure, usage spikes and/or surges, human error, software malfunctions, infrastructure hardware failure, third party provider outages, and/or the like. Missed opportunities to avoid downtime may include failing to identify when usage is trending towards a danger level (e.g., more traffic than a network can efficiently handle or a primary storage share running out of space), failing to identify that critical hardware (or software) performance is trending steadily downward, and/or the like. The quantity of enterprises utilizing cloud computing environment is continuously increasing and consume a large share of total Internet traffic. Due to resource sharing and complexity of a cloud computing environment, the hybrid cloud applications are prone to anomalous behavior, such as network or resource issues. The misconfiguration of application components, such as a load balancer and an auto scaler, may also lead to abrupt behavior and performance issues.

Therefore, current techniques for providing a hybrid cloud application consume computing resources (e.g., processing resources, memory resources, communication resources, and/or the like), networking resources, and/or the like associated with failing to handle large volumes of data associated with the hybrid cloud application, failing to identify dangerous usage levels of the hybrid cloud application, failing to identify poor performance of software and/or computational components associated with the hybrid cloud application, providing poor user experiences for the hybrid cloud application, and/or the like.

Some implementations described herein relate to an application system that utilizes digital twins for data-driven risk identification and root cause analysis of a distributed and heterogeneous system. For example, the application system may receive system data identifying computational components and software components of a distributed and heterogeneous system executing a hybrid cloud application, and may create digital twins for the computational components and the software components of the distributed and heterogeneous system. The application system may create a central digital twin to receive functional data, operational data, and KPIs from the digital twins, and may create complex KPIs based on the functional data, the operational data, and the KPIs received from the digital twins. The application system may modify, based on the complex KPIs, one or more of the digital twins to generate additional KPIs, and may process the additional KPIs, with a trained principal component analysis model, to detect one or more first anomalies in the distributed and heterogeneous system. The application system may process the additional KPIs, with a trained self-organizing maps model, to detect one or more second anomalies in the distributed and heterogeneous system, and may generate, based on the one or more first anomalies and the one or more second anomalies, a KPI cause vector identifying a root cause associated with the one or more first anomalies and the one or more second anomalies. The application system may perform one or more actions based on the root cause.

In this way, the application system utilizes digital twins for data-driven risk identification and root cause analysis of a distributed and heterogeneous system. For example, the application system may utilize digital twins for identifying anomalies associated with hybrid cloud application, logical components associated with the anomalies, and root causes of the anomalies. Each logical component (e.g., a computational component or a software component) of the hybrid cloud application may be associated with a digital twin at an appropriate granularity. A centralized digital twin may be associated with the digital twins and may conduct the analytics to identify the anomalies and the root causes of the anomalies. The application system may correct the anomalies and/or the root causes before the distributed and heterogeneous system crashes or there is a significant impact on service level agreements. This, in turn, conserves computing resources, networking resources, and/or the like that would otherwise have been consumed in failing to handle large volumes of data with the digital twin, incorrectly managing the large volumes of data with the digital twin, losing data due to failing to handle large volumes of data with the digital twin, handling failures of the digital twin due to data overload, and/or the like.

FIGS. 1A-1H are diagrams of an example 100 associated with utilizing digital twins for data-driven risk identification and root cause analysis of a distributed and heterogeneous system. As shown in FIGS. 1A-1H, example 100 includes an application system that includes cloud devices (e.g., provided in a public cloud infrastructure) associated with edge devices. The application system may form a distributed and heterogeneous system. Each of the cloud devices may include one or more computational components associated with one or more software components of a hybrid cloud application. Each of the edge devices may include one or more computational components associated with one or more software components of the hybrid cloud application. The application system may include a system that utilizes digital twins for data-driven risk identification and root cause analysis of a distributed and heterogeneous system. Further details of the application system, the cloud devices, the edge devices, the computational components, and the software components are provided elsewhere herein.

FIG. 1A provides an overview of an example distributed and heterogeneous system. As shown in FIG. 1A, the application system may be provided in a public cloud infrastructure and may include the cloud devices and the software components. The application system may provide the hybrid cloud application for the edge devices. The edge devices may be provided in an edge layer, such as an on premises cloud infrastructure. Each of the cloud devices and the edge devices may include one or more computational components (e.g., processors, memories, load balancers, and/or the like).

As further shown in FIG. 1A, and by reference number 105, the application system may receive system data from the distributed and heterogeneous system executing the hybrid cloud application. For example, portions of the hybrid cloud application (e.g., different software components of the hybrid cloud application) may be spread over two or more different computational components of the distributed and heterogeneous system (e.g., computational components of the cloud devices and the edge devices). The application system may continuously receive the system data from the cloud devices and the edge devices, may periodically receive the system data from the cloud devices and the edge devices, may receive the system data from the cloud devices and the edge devices based on providing requests for the system data to the cloud devices and the edge devices, and/or the like.

The system data may include data identifying the computational components of the cloud devices and the edge devices executing one or more portions of the hybrid cloud application; the software components of the cloud devices and the edge devices that constitute one or more portions of the hybrid cloud application; functional data associated with the computational components of the cloud devices and the edge devices; operational data associated with the computational components of the cloud devices and the edge devices; functional data associated with the software components of the cloud devices and the edge devices; operational data associated with the software components of the cloud devices and the edge devices; and/or the like.

Figure 1B:
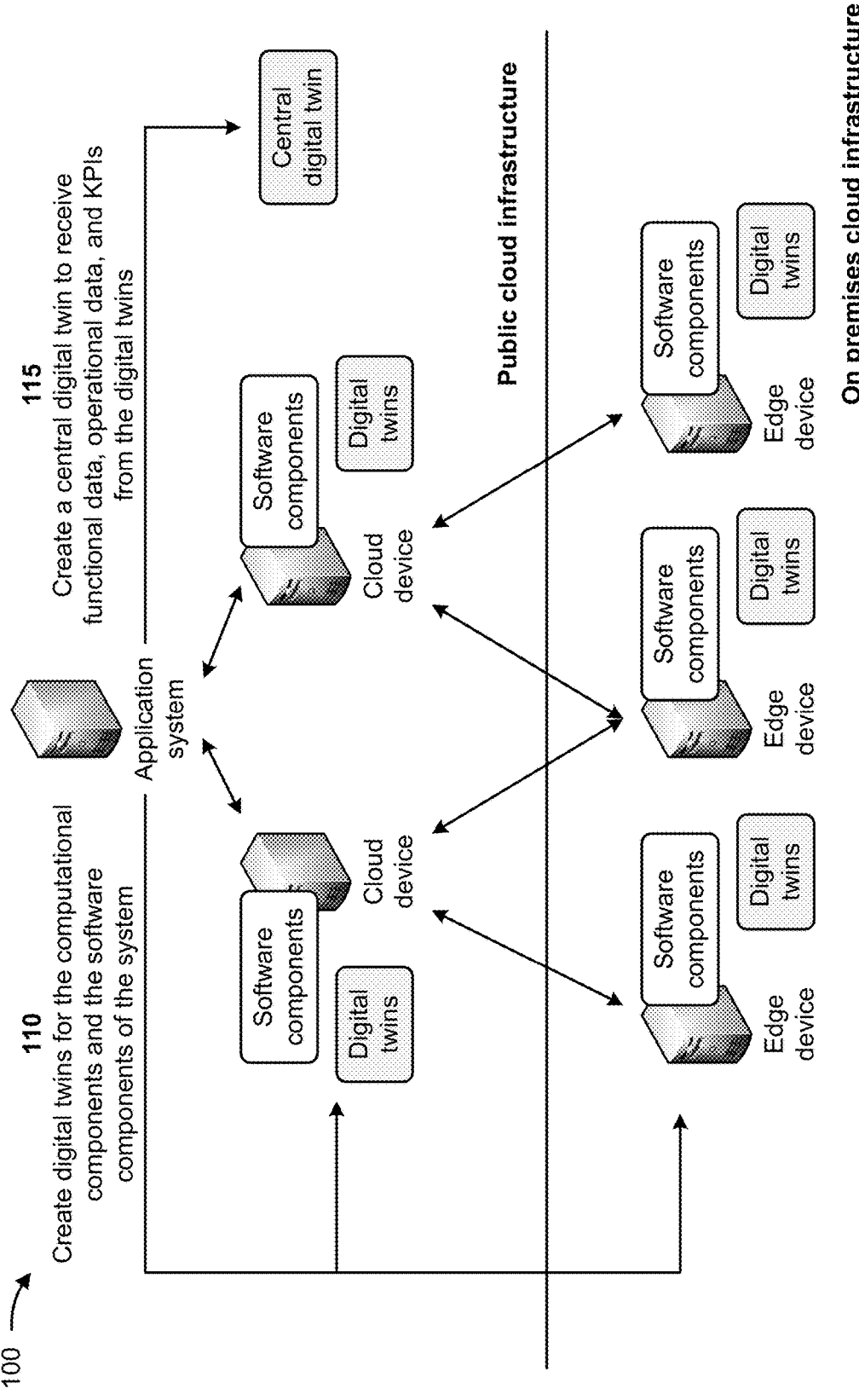

As shown in FIG. 1B, and by reference number 110, the application system may create digital twins for the computational components and the software components of the distributed and heterogeneous system. For example, the application system may analyze the system data to identify the computational components and the software components of the cloud devices and the edge devices executing the hybrid cloud application. The application system may create the digital twins for the identified computational components and the identified software components. For example, the application system may cause the identified cloud devices and the identified edge devices to instantiate digital twins for the computational components and the software components associated with the cloud devices and the edge devices. In some implementations, the application system may instantiate the digital twins for the computational components and the software components associated with the cloud devices and the edge devices. Each of the digital twins may include a virtual representation that serves as a real-time digital counterpart for each of the software components and each of the computational components (e.g., a hardware component on which a software component is executing).

In some implementations, when creating digital twins for the computational components, the application system may, for each computational component, collect functional data associated with the computational component, collect operational data associated with the computational component, and create the digital twin for the computational component based on the functional data and the operational data associated with the computational component. In some implementations, when creating digital twins for the software components, the application system may, for each software component, collect functional data associated with the software component, collect operational data associated with the software component, and create the digital twin for the software component based on the functional data and the operational data associated with the software component.

As further shown in FIG. 1B, and by reference number 115, the application system may create a central digital twin to receive functional data, operational data, and KPIs from the digital twins. For example, each of the digital twins may collect functional logs (e.g., that includes data identifying functions performed) and operational logs (e.g., that includes data identifying temperature, data transfer rate, a read input/output rate, processor flops, network packet counts, and/or the like) associated with a corresponding computational component or a corresponding software component, and may generate functional data for the corresponding computational component or the corresponding software component based on the functional logs. Each of the digital twins may generate operational data for the corresponding computational component or the corresponding software component based on the operational logs, and may generate KPIs for the corresponding computational component or the corresponding software component based on the functional logs and operational logs. Each of the digital twins may provide the functional data, the operational data, and the KPIs for the corresponding computational component or the corresponding software component to the central digital twin. The KPIs may include functional data-level KPIs associated with the digital twins of the computational components and the software components, operational data-level KPIs associated with the digital twins of the computational components and the software components, and/or the like. For example, the KPIs may include KPIs associated with device health (e.g., processor and memory utilization, temperature, and/or the like), device availability, latency and packet loss, network traffic, jitter, and/or the like.

In one example, in a transmission control protocol (TCP) network, a digital twin may record a data point value at a point of transmission (e.g., just before encryption, for an encrypted TCP network), to form KPIs, may record an average packet queue length, a packet arrival rate, a packet drop rate, and/or the like, to form KPIs, and/or the like. In another example, in a privacy-preserving application where a portion of data is private and is to be processed in a local edge device, and a remaining portion of the data may be shared with the non-private cloud devices, a digital twin may generate KPIs based on a quantity of data records processed locally, a quantity of data records shared with the cloud, a time-series of a quantity of data packets shared with the cloud and/or kept private at each time period, a distribution of hardware type, a quantity of data records/fields processed on such hardware types, and/or the like.

The digital twins of the cloud devices and the edge devices may communicate with the central digital twin, and each of the digital twins of the cloud devices may communicate with one or more digital twins of the edge devices. In some implementations, the application system may create a central digital twin that receives the functional data, the operational data, and the KPIs from the digital twins (e.g., to bring heterogeneous distributed knowledge into a unified, homogeneous central location). In some implementations, the central digital twin may continuously receive the functional data, the operational data, and the KPIs from the digital twins, may periodically receive the functional data, the operational data, and the KPIs from the digital twins, may receive the functional data, the operational data, and the KPIs from the digital twins based on providing requests to the digital twins.

Figure 1C:
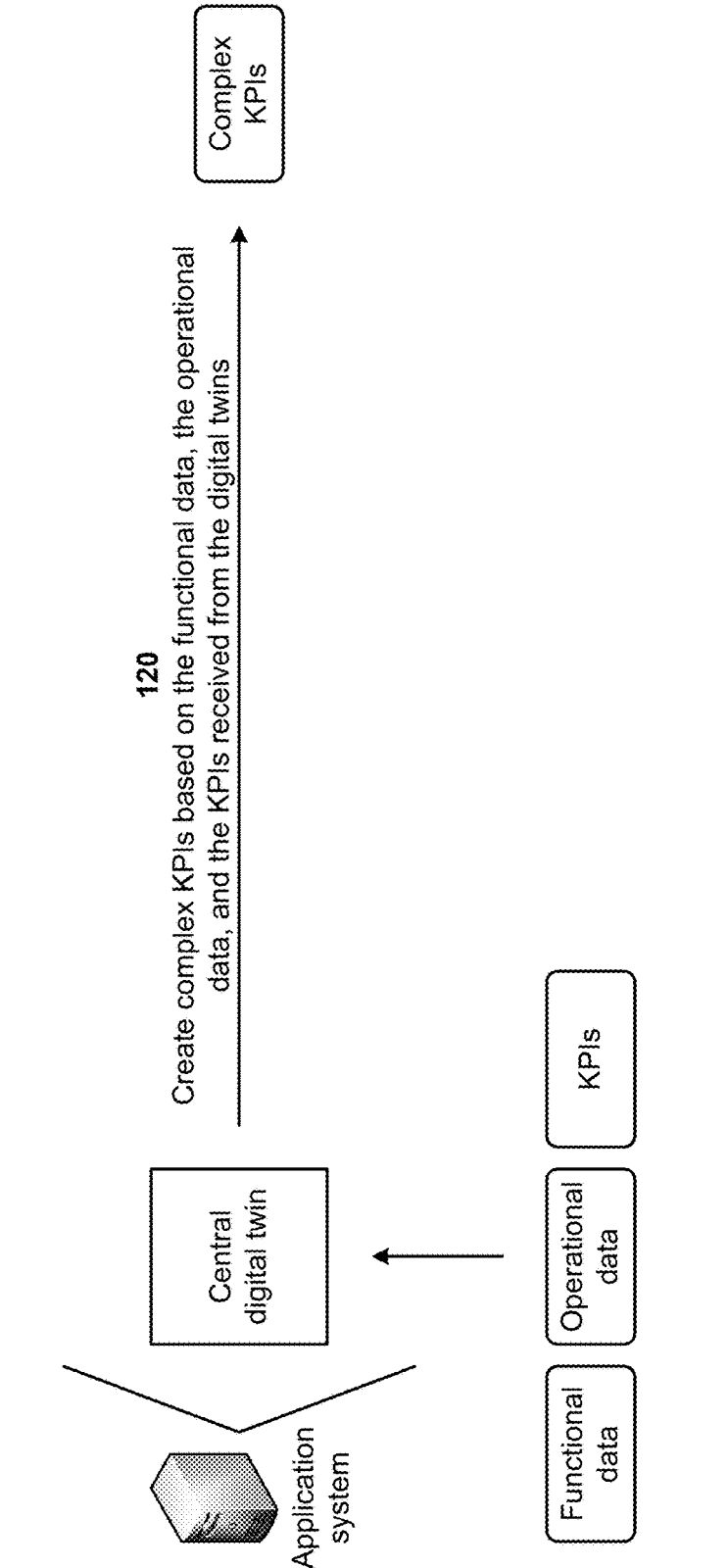

As shown in FIG. 1C, and by reference number 120, the application system may utilize the central digital twin to create complex KPIs based on the functional data, the operational data, and the KPIs received from the digital twins. For example, the central digital twin may generate complex KPIs based on the functional data, the operational data, and the KPIs. In some implementations, the central digital twin may perform mathematical and logical operations on the functional data, the operational data, and the KPIs to create the complex KPIs. The central digital twin may create complex KPIs based on the functional data, the operational data, and/or the KPIs associated with some or all of the computational components and/or some or all of the software components.

A complex KPI may include an outcome of a series of mathematical and logical operations performed one the functional data, the operational data, and the KPIs received from the digital twins. The mathematical and logical operations may include addition, subtraction, multiplication, division, module, a logical and, a logical or, a logical not, a logical exclusive or, and/or the like. In some implementations, if additional operational data is available, the central digital twin may divide the additional operational data to compute similar complex KPIs for the operational data. For example, the central digital twin may compute some complex KPIs for all servers in North America, some complex KPIs for all specific types of servers, and/or the like. In some implementations, when processing required for complex KPIs is too large for the central digital twin, functional approximators (e.g., neural networks, linear or non-linear function approximations, and/or the like) may be utilized so that similar KPIs may be encoded to similar representations.

Figure 1D:
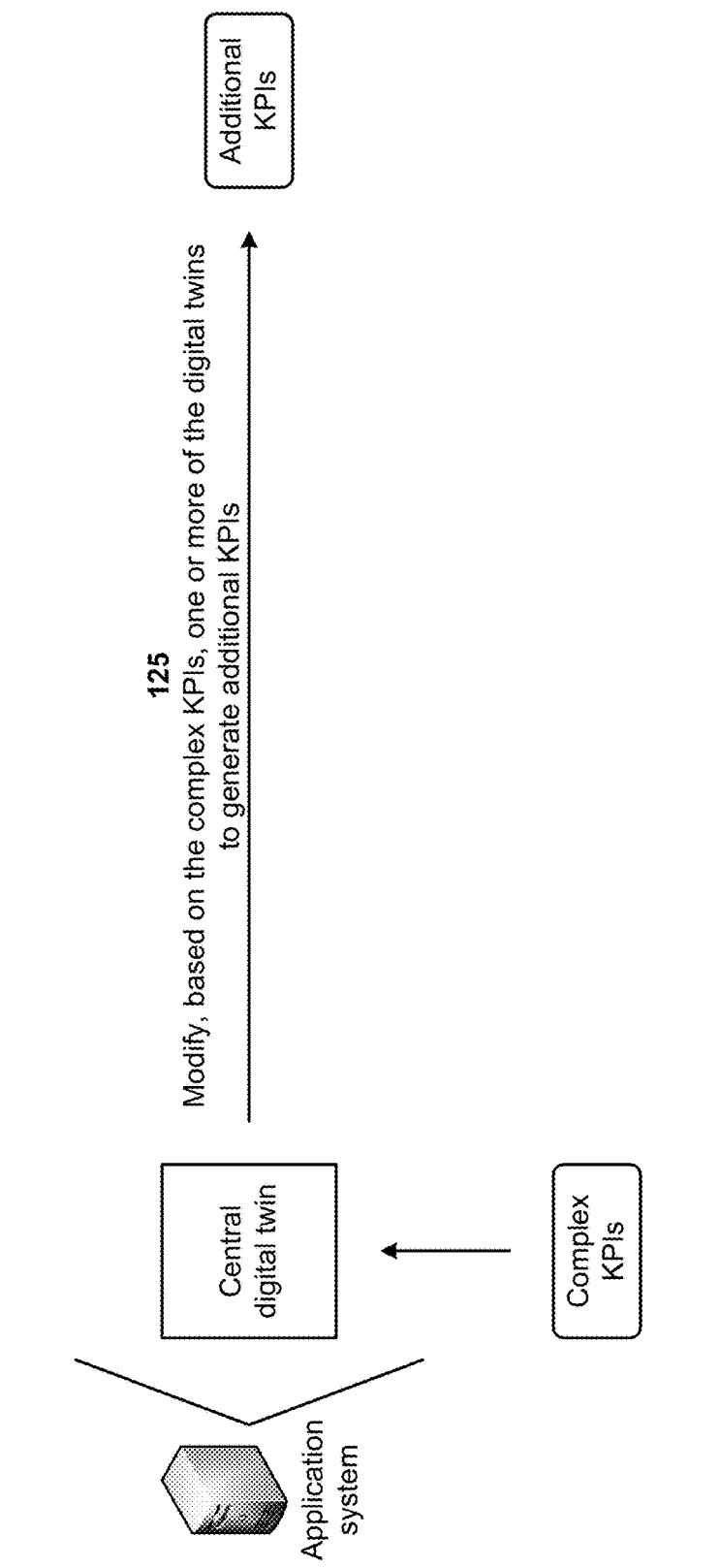

As shown in FIG. 1D, and by reference number 125, the application system may utilize the central digital twin to modify, based on the complex KPIs, one or more of the digital twins to generate additional KPIs. For example, when modifying, based on the complex KPIs, the one or more of the digital twins to generate the additional KPIs, the application system may utilize the central digital twin to cause one or more of the digital twins to perform initial analytics based on the complex KPIs, and to perform additional analytics based on the initial analytics. The central digital twin may cause the one or more of the digital twins to perform initial corrective actions based on additional analytics, and to generate additional KPIs based on performing the initial corrective actions. The initial corrective actions may cause the one or more of the digital twins to be reshaped and to receive functional data and operational data at renewed rates, types, frequencies, and/or the like, and to generate the additional KPIs that may be combined with the existing set of KPIs (e.g., thereby making the set of KPIs grow elastically).

In some implementations, a digital twin may perform a corrective initial action or set of actions to remedy a known fault (e.g., if all workload goes to single virtual machine (VM) while four VMs are available, a load balancer may be corrupted and thus may be reconfigured). Once the initial corrective action is performed, an additional the data collection pipeline may be created to monitor the corrective action (e.g., additional monitoring may be performed for periodic analysis of the load balancer configuration). The additional data may be utilized to calculate the additional KPIs and/or complex KPIs. In this way, the KPI set grows elastically and makes a digital twin of the hybrid cloud application more encompassing with more profound analytical capabilities.

Figure 1E:
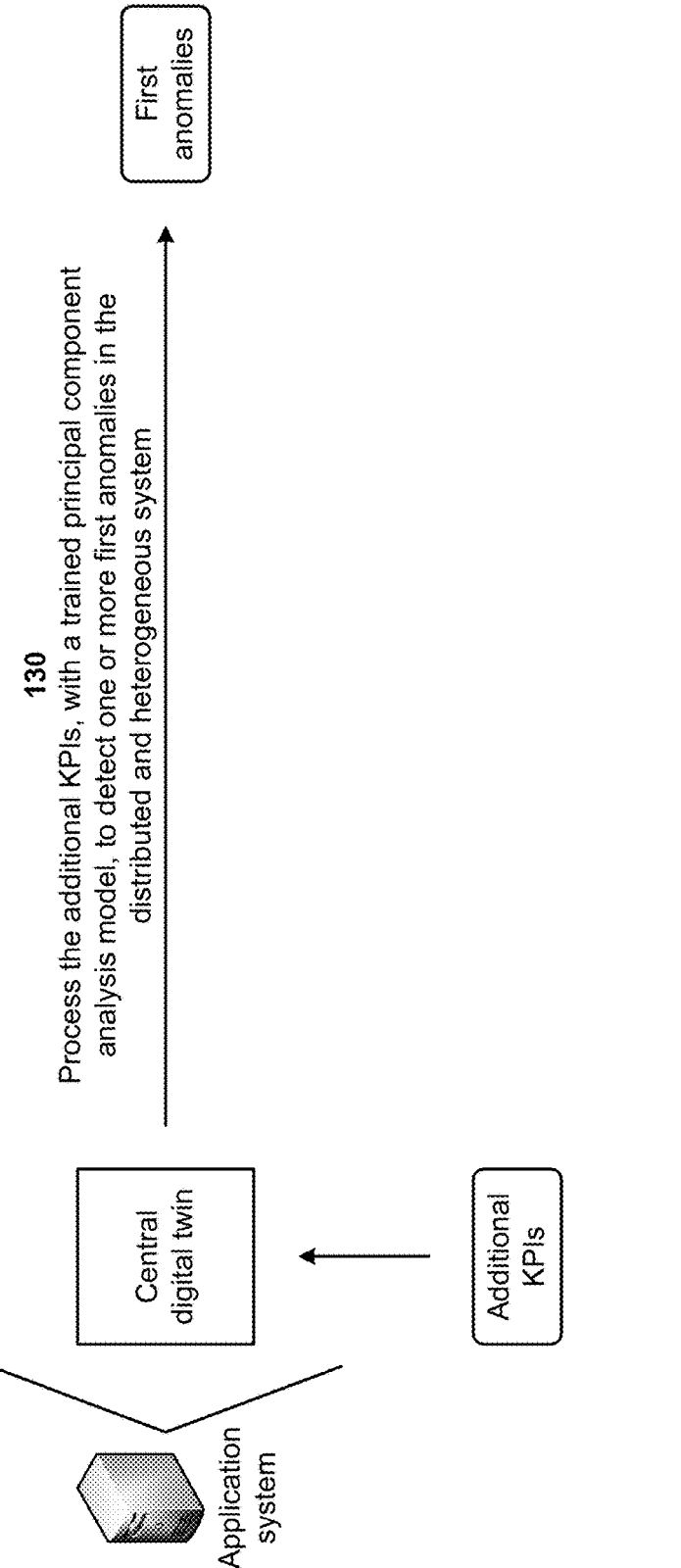

As shown in FIG. 1E, and by reference number 130, the application system may utilize the central digital twin to process the additional KPIs, with a trained principal component analysis model, to detect one or more first anomalies in the distributed and heterogeneous system. For example, the central digital twin may include a trained principal component analysis (PCA) model that performs a PCA reconstruction error technique to determine anomalies in the distributed and heterogeneous system. PCA is a technique for analyzing large datasets containing a large quantity of dimensions/features per observation, reducing a dimensionality of datasets to aid data visualization, and enabling the visualization of multidimensional data. A reconstruction error in the PCA context is a variability of data that is not captured in a lower dimensional space. The central digital twin may process the additional KPIs and/or the complex KPIs, with the trained principal component analysis model, to detect one or more first anomalies in the distributed and heterogeneous system.

For example, if the central digital twin collects normal data X (e.g., data without any faults), the central digital twin may calculate a mean center of X as X-mean(X), and may calculate directions (U and S) and a variance (Vt) of the data based on a singular value decomposition (SVD), as follows U, S, Vt=SVD(X). The central digital twin may select a first k eigenvectors with a cumulative variance greater than a threshold (e.g., 95%) according to: Vt=Vt[:k]. The central digital twin may reconstruct X by projecting on the eigenvectors according to:

$$\hat{x}_n = \sum_{i=i}^{k}(x_n \cdot v_i)v_i, \forall\, x_n \in X, \text{ and } v_i \in Vt.$$

The central digital twin may calculate a reconstruction error (re) according to:

$$re(x_n) = \|(x_n - \hat{x}_n)\|_2.$$

The central digital twin may define a threshold for the reconstruction error (e.g., 85%) and may determine that data associated with a reconstruction error that is greater than the threshold is anomalous and that data associated with a reconstruction error that is less than or equal to the threshold is normal (e.g., not anomalous).

In some implementations, when processing the additional KPIs, with the trained principal component analysis model, to detect the one or more first anomalies in the distributed and heterogeneous system, the application system may utilize the central digital twin to calculate a reconstruction error associated with the additional KPIs, determine whether the reconstruction error satisfies a threshold, and detecting the one or more first anomalies in the distributed and heterogeneous system based on the reconstruction error failing to satisfy the threshold.

Figure 1F:
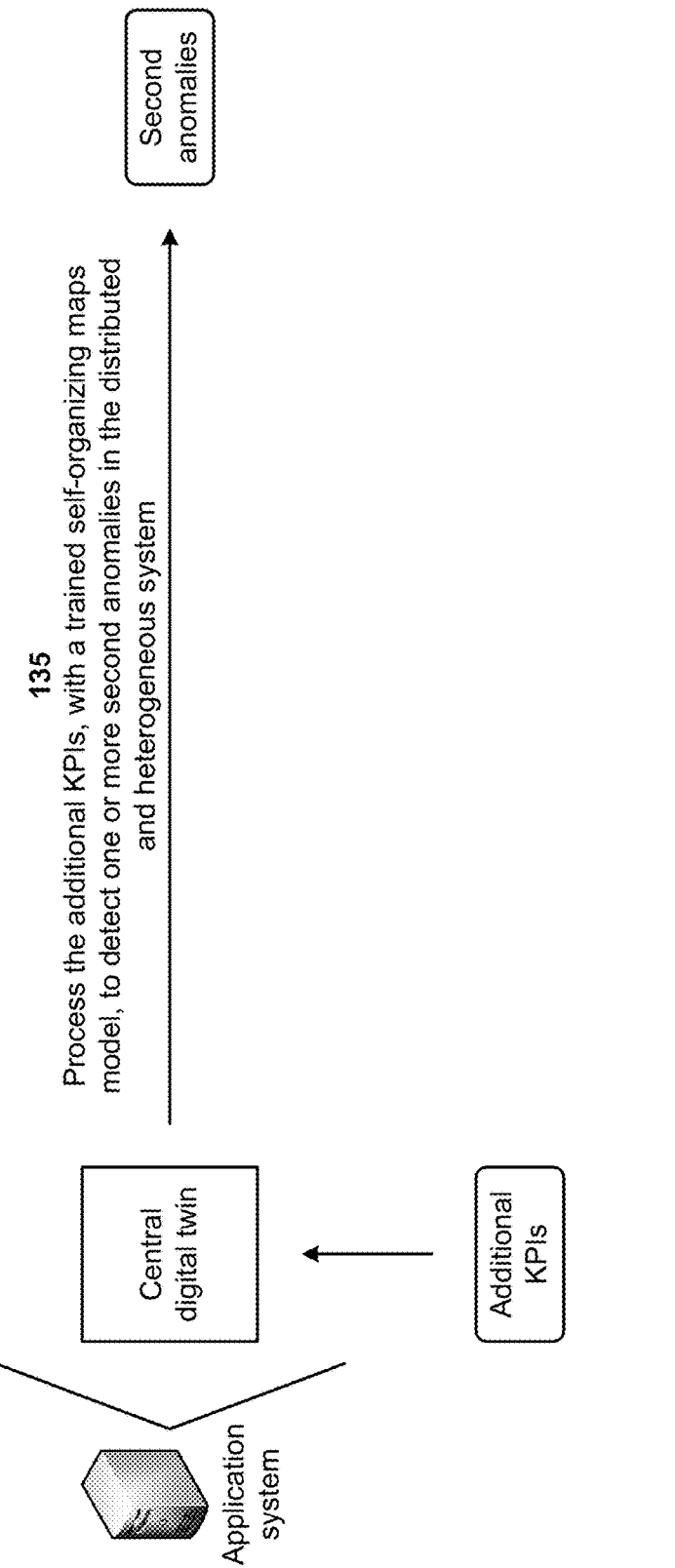

As shown in FIG. 1F, and by reference number 135, the application system may utilize the central digital twin to process the additional KPIs, with a trained self-organizing maps model, to detect one or more second anomalies in the distributed and heterogeneous system. For example, the central digital twin may include trained self-organizing maps (SOM) model that determines anomalies in the distributed and heterogeneous system. A SOM model may be utilized for clustering and mapping (or dimensionality reduction) techniques that map multidimensional data onto a lower dimension, which reduces complex problems for easier interpretation. A SOM model may include an input layer and an output layer. The application system may train the SOM model based on data $(x_t)$ received by the central digital twin. The application system may initialize (randomly or otherwise) node weights Win of the SOM model, and may identify a best matching unit (BMU) node n with respect to the data $(x_t)$ in the SOM model. The BMU may be determined by calculating a distance (L2) between the data $(x_t)$ and every node of the SOM, and may include a node with smallest distance. The application system may update the weights of the SOM nodes in a neighborhood of the data $(x_t)$, such that the weights change towards the data $(x_t)$, according to: $W_{t+1}=W_t+\alpha^*nbh(n)^*(x_t-W_t)$, where nbh is a neighborhood function (e.g., defined as one for top, left, bottom, and right and zero for others, or a Gaussian neighborhood function may be utilized) and a is a learning rate that decides how quickly the weights should be changed. The application system may repeat the determination of the BMU node and the update of the weights for n iterations. After enough updates of the weights, there will be tight cluster of nodes that define normal behavior, whereas nodes that define anomalous behavior will be sparse in the neighborhood function as anomalous behavior would be uncommon compared to normal behavior.

Once the SOM model is trained, the application system may utilize the SOM model to detect the one or more second anomalies in the distributed and heterogeneous system. In some implementations, when processing the additional KPIs and/or the complex KPIs, with the trained self-organizing maps model, to detect the one or more second anomalies in the distributed and heterogeneous system, the application system may identify a best matching unit associated with the additional KPIs, and may identify, in the additional KPIs, neighbors of the best matching unit. The application system may calculate a neighborhood size of the best matching unit, and may determine whether the neighborhood size of the best matching unit satisfies a threshold. The application may detect the one or more second anomalies in the distributed and heterogeneous system based on the neighborhood size of the best matching unit failing to satisfy the threshold. For example, if $(x_t)$ may represent data received by the central digital twin, the application system may identify the best matching unit (BMU) node n with respect to the data $(x_t)$. The BMU may be determined by calculating a distance (L2) between the data $(x_t)$ and every node of the SOM, and may include a node with smallest distance. The application system may identify a neighborhood nbh(n) of the BMU node n. The neighborhood may be top, left, bottom, right nodes or a weighted neighborhood function such as a Gaussian function. The application may calculate neighborhood size s nbh(n) of the BMU node n, where the neighborhood size is a sum of distances between the BMU node n and the neighborhood nbh(n) and may be calculated according to: $s_{nbh(n)}=\Sigma_{nbh(n)}D(n, nbh(n))$ or $s_{nbh(n)}=\Sigma nbh(n)*D(n, nbh(n))$, where a distance function D may include any distance function (e.g., a Manhattan distance function). The central digital twin may define a threshold for the neighborhood size and may determine that data associated with a neighborhood size that is greater than the threshold is anomalous and that data associated with a neighborhood size that is less than or equal to the threshold is normal (e.g., not anomalous).

Figure 1G:
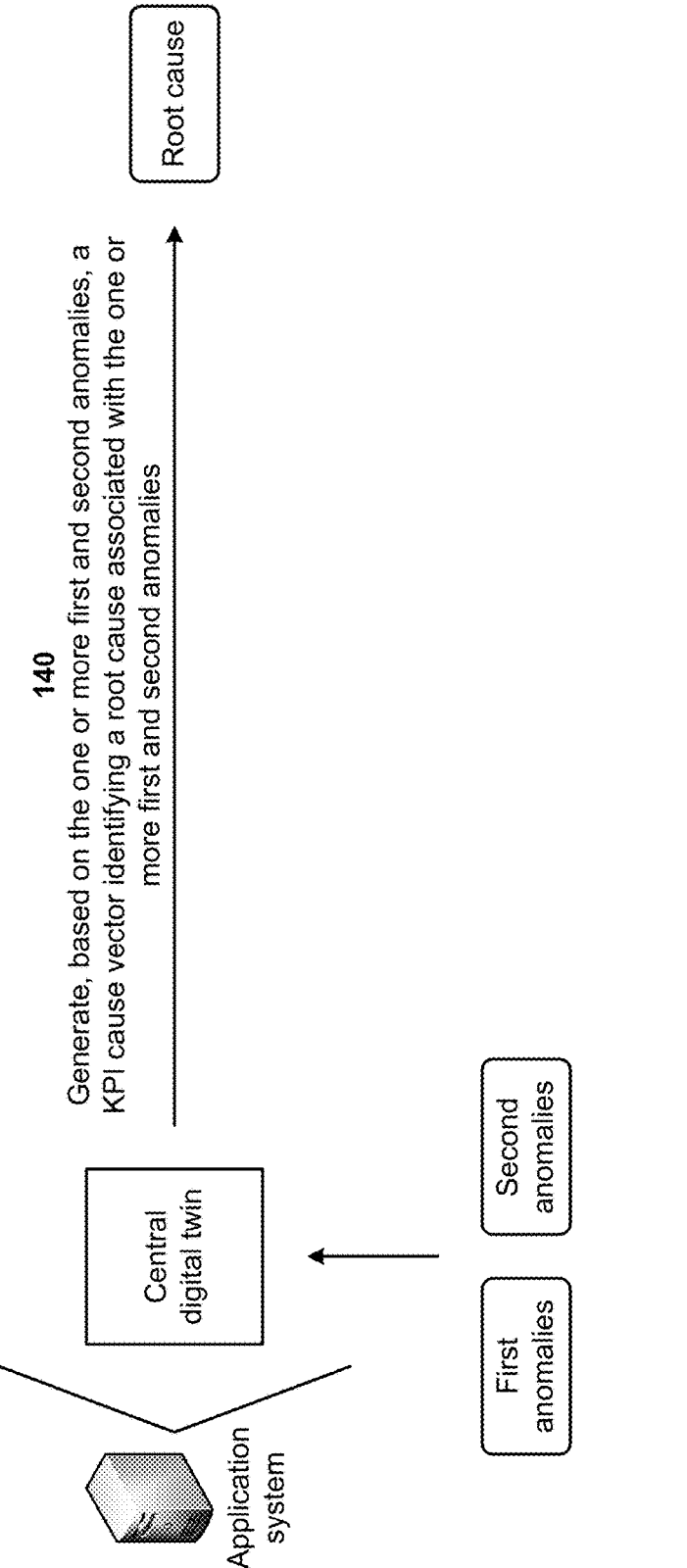

As shown in FIG. 1G, and by reference number 140, the application system may utilize the central digital twin to generate, based on the one or more first and second anomalies, a KPI cause vector identifying a root cause associated with the one or more first and second anomalies. For example, the application system may utilize the central digital twin to iteratively update a KPI cause vector and perform root cause analysis. A KPI cause vector is a vector representation for which current KPIs are most responsible for current behavior of the distributed and heterogeneous system (e.g., an anomalous state). The central digital twin may continuously monitor the elastic KPI set from the digital twins and may search for any anomalies. Some of the anomalies may be detected because of the noise in the distributed and heterogeneous system and therefore anomalous behavior may be determined only if a threshold quantity of anomalies are detected in a time period. Once the distributed and heterogeneous system is determined to be in an anomalous state, the central digital twin may create the KPI cause vector that identifies which KPIs may be responsible for a root cause (e.g., a first level root cause). The central digital twin may compact the KPI cause vector with a precomputed KPI vector for each root cause (e.g., each first level root cause). The central digital twin may also utilize the PCA model and/or the SOM model to score the first level root cause. The central digital twin may utilize the score along with a KPI comparison score to localize the first level root cause. Over time, the central digital twin may iterate the process of creating KPI cause vector and localizing the root cause.

In some implementations, the central digital twin may generate the KPI cause vector for an ith root cause level using the SOM model for (i–1)th root cause level. Once the root cause is localized at the (i–1)th root cause level, the central digital twin may identify normal neighbor nodes of a BMU node by traversing the neighbor nodes of BMU node and identifying k normal neighbor nodes. If k normal neighbors are not identified, the central digital twin may extend the search to neighbor nodes of the neighbor nodes until k normal neighbors are identified. The central digital twin may determine a weighted/average difference between the BMU node and the normal neighbors to create the KPI cause vector. The central digital twin may also identify the normal neighbors using a function (e.g., a Gaussian function) that weight all the normal nodes with respect to their distances from BMU node (e.g., closer nodes receive more weight). A weighted difference between the BMU node and all the normal neighbors may generate the KPI cause vector.

As shown in FIG. 1H, and by reference number 145, the application system may perform one or more actions based on the root cause. In some implementations, performing the one or more actions includes the application system reconfiguring a load balancer and an auto scaler associated with the distributed and heterogeneous system. For example, the application system may identify the root cause as a misconfigured load balancer and auto scaler when the functional data associated with the edge devices does not show anomaly in any edge device, network data does not show any anomaly of speed or correctness (e.g., packet drops), but the cloud devices show a load imbalance with some cloud devices experiencing much more load than the other cloud devices. The application system may reconfigure the load balancer and the auto scaler associated with the distributed and heterogeneous system to correct the misconfiguration and the load imbalance. In this way, the application system conserves computing resources, networking resources, and/or the like that would otherwise have been consumed in failing to handle large volumes of data with the digital twin.

In some implementations, performing the one or more actions includes the application system correcting a network slowdown associated with the distributed and heterogeneous system. For example, application system may identify the root cause as a network slowdown when functional data associated with the edge devices does not show anomaly in any edge device, but a rate of outgoing requests from the edge devices is higher, much higher, or sustained higher than a rate of incoming requests at a cloud device (e.g., an auto scaler) or a combined length of a network socket queue across the edge devices is greater than a threshold. The application system may reconfigure the edge devices and/or the auto scaler associated with the distributed and heterogeneous system to correct the network slowdown. In this way, the application system conserves computing resources, networking resources, and/or the like that would otherwise have been consumed in incorrectly managing the large volumes of data with the digital twin.

In some implementations, performing the one or more actions includes the application system correcting network errors associated with the distributed and heterogeneous system. For example, application system may identify the root cause as a network error (e.g., data loss) when functional data associated with the edge devices does not show anomaly in any edge device, but a quantity number of requests transmitted from across the edge devices are less than a quantity of requests received at a cloud device (e.g., an auto scaler). The application system may reconfigure the edge devices and/or the auto scaler associated with the distributed and heterogeneous system to correct the network error. In this way, the application system conserves computing resources, networking resources, and/or the like that would otherwise have been consumed in losing data due to failing to handle large volumes of data with the digital twin.

In some implementations, performing the one or more actions includes the application system correcting a software issue of an edge device associated with the distributed and heterogeneous system. For example, application system may identify the root cause as an edge device software issue when functionality issues are seen in an edge device. The application system may reconfigure the edge device associated with the distributed and heterogeneous system to correct the software issue. In this way, the application system conserves computing resources, networking resources, and/or the like that would otherwise have been consumed in incorrectly managing the large volumes of data with the digital twin.

In some implementations, performing the one or more actions includes the application system correcting a software issue of a cloud device associated with the distributed and heterogeneous system. For example, application system may identify the root cause as a cloud device software issue when functionality issues are seen in the cloud device (e.g., a backend processing/data center). The application system may reconfigure the cloud device associated with the distributed and heterogeneous system to correct the software issue. In this way, the application system conserves computing resources, networking resources, and/or the like that would otherwise have been consumed in incorrectly managing the large volumes of data with the digital twin.

In this way, the application system utilizes digital twins for data-driven risk identification and root cause analysis of a distributed and heterogeneous system. For example, the application system may utilize digital twins for identifying anomalies associated with hybrid cloud application, logical components associated with the anomalies, and root causes of the anomalies. Each logical component of the hybrid cloud application may be associated with a digital twin at an appropriate granularity. A centralized digital twin may be associated with the digital twins and may conduct the analytics to identify the anomalies and the root causes of the anomalies. The application system may correct the anomalies and/or the root causes before the distributed and heterogeneous system crashes or there is a significant impact on service level agreements. This, in turn, conserves computing resources, networking resources, and/or the like that would otherwise have been consumed in failing to handle large volumes of data with the digital twin, incorrectly managing the large volumes of data with the digital twin, losing data due to failing to handle large volumes of data with the digital twin, handling failures of the digital twin due to data overload, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS.

1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
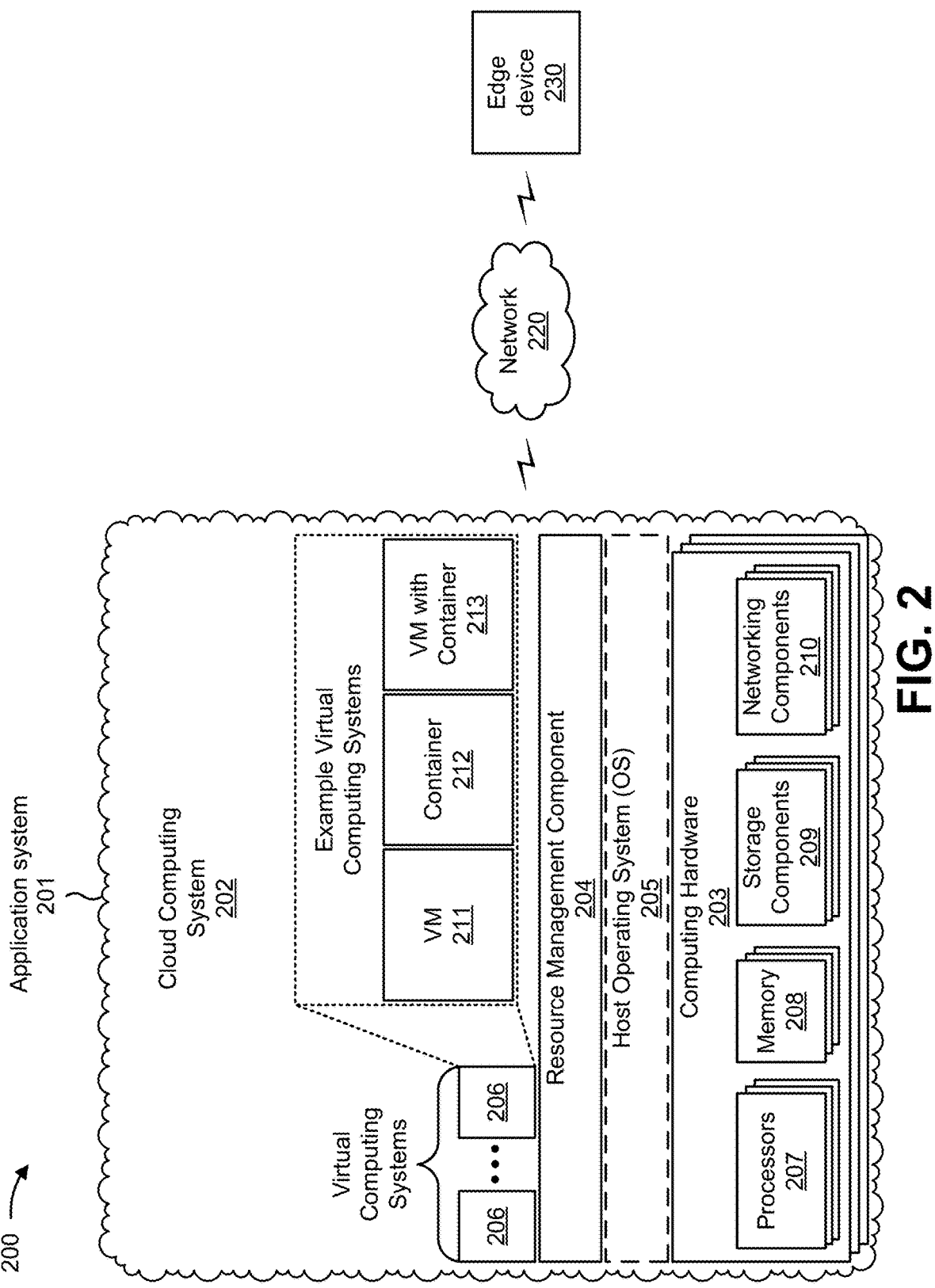
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include an application system 201, which may include one or more elements of and/or may execute within a cloud computing system 202. The cloud computing system 202 may include one or more elements 203-213, as described in more detail below. As further shown in FIG. 2, the environment 200 may include a network 220 and/or an edge device 230. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of the computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the application system 201 may include one or more elements 203-213 of the cloud computing system 202, may execute within the cloud computing system 202, and/or may be hosted within the cloud computing system 202, in some implementations, the application system 201 may not be cloud-based (e.g., may be implemented outside of a cloud computing system) or may be partially cloud-based. For example, the application system 201 may include one or more devices that are not part of the cloud computing system 202, such as device 300 of FIG. 3, which may include a standalone server or another type of computing device. The application system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or the like, and/or a combination of these or other types of networks. The network 220 enables communication among the devices of the environment 200.

The edge device 230 may include one or more devices capable of receiving, generating, storing, processing, providing, and/or routing information, as described elsewhere herein. The edge device 230 may include a communication device and/or a computing device. For example, the edge device 230 may include a server, such as an application server, a client server, a web server, a database server, a host server, a proxy server, a virtual server (e.g., executing on computing hardware), or a server in a cloud computing system. In some implementations, the edge device 230 may include computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
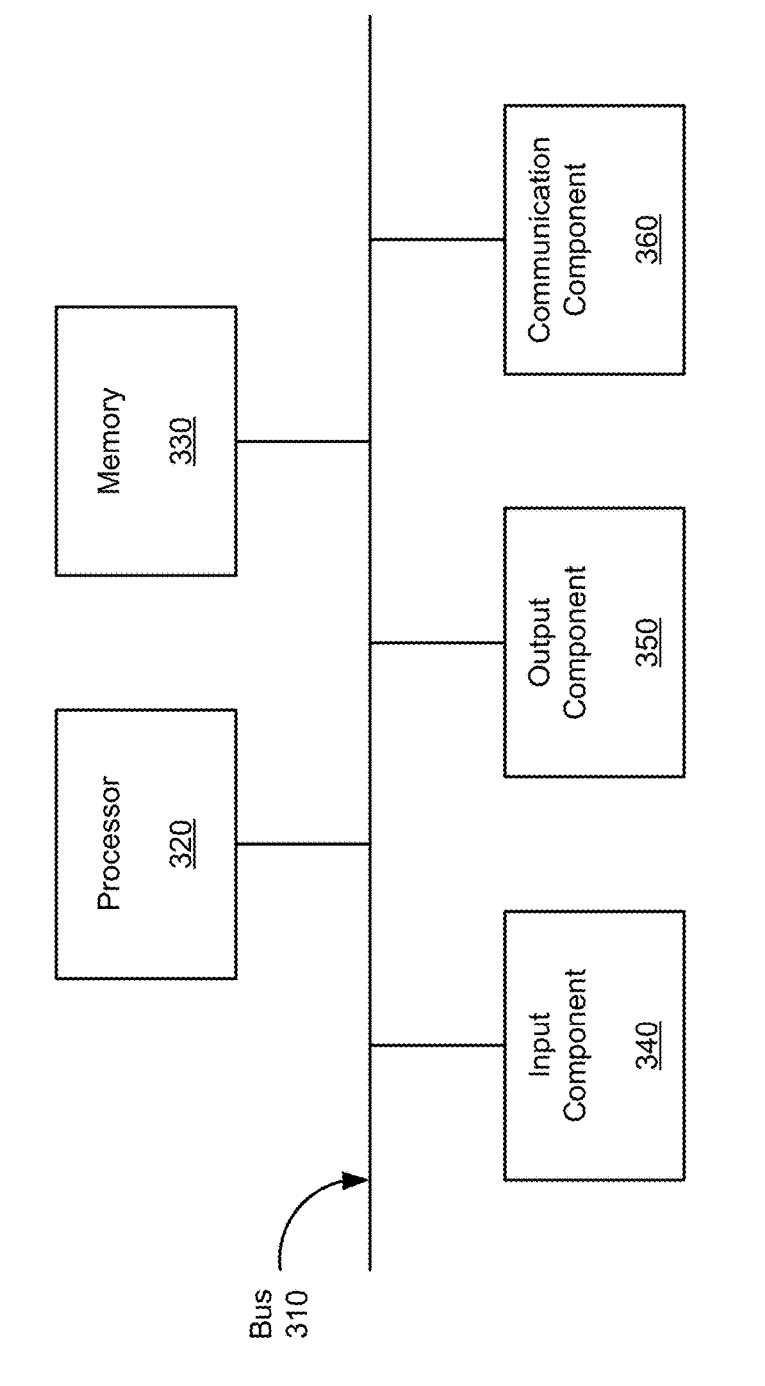
FIG. 3 is a diagram of example components of one or more devices of FIG. 2.

FIG. 3 is a diagram of example components of a device 300, which may correspond to the application system 201, the edge device 230, and/or the cloud device. In some implementations, the application system 201, the edge device 230, and/or the cloud device may include one or more devices 300 and/or one or more components of the device 300. As shown in FIG. 3, the device 300 may include a bus 310, a processor 320, a memory 330, an input component 340, an output component 350, and a communication component 360.

The bus 310 includes a component that enables wired and/or wireless communication among the components of device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory).

The input component 340 enables the device 300 to receive input, such as user input and/or sensed inputs. For example, the input component 340 may include a touch screen, a keyboard, a keypad, a mouse, a button, a microphone, a switch, a sensor, a global positioning system component, an accelerometer, a gyroscope, an actuator, and/or the like. The output component 350 enables the device 300 to provide output, such as via a display, a speaker, and/or one or more light-emitting diodes. The communication component 360 enables the device 300 to communicate with other devices, such as via a wired connection and/or a wireless connection. For example, the communication component 360 may include a receiver, a transmitter, a transceiver, a modem, a network interface card, an antenna, and/or the like.

The device 300 may perform one or more processes described herein. For example, a non-transitory computer-readable medium (e.g., the memory 330) may store a set of instructions (e.g., one or more instructions, code, software code, program code, and/or the like) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for utilizing digital twins for data-driven risk identification and root cause analysis of a distributed and heterogeneous system. In some implementations, one or more process blocks of FIG. 4 may be performed by a device (e.g., the application system 201). In some implementations, one or more more process blocks of FIG. 4 may be performed by another device or a group of devices separate from or including the device, such as an edge device (e.g., the edge device 230). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving system data identifying computational components and software components of a distributed and heterogeneous system executing a hybrid cloud application (block 410). For example, the device may receive system data identifying computational components and software components of a distributed and heterogeneous system executing a hybrid cloud application, as described above. In some implementations, the system data includes data identifying one or more of functional data associated with the computational components of the distributed and heterogeneous system, operational data associated with the computational components of the distributed and heterogeneous system, functional data associated with the software components of the distributed and heterogeneous system, and operational data associated with the software components of the distributed and heterogeneous system.

As further shown in FIG. 4, process 400 may include creating digital twins for the computational components and the software components of the distributed and heterogeneous system (block 420). For example, the device may create digital twins for the computational components and the software components of the distributed and heterogeneous system, as described above.

As further shown in FIG. 4, process 400 may include creating a central digital twin to receive functional data, operational data, and KPIs from the digital twins (block 430). For example, the device may create a central digital twin to receive functional data, operational data, and KPIs from the digital twins, as described above. In some implementations, each of the digital twins is configured to collect functional logs and operational logs associated with a corresponding computational component or a corresponding software component; generate functional data for the corresponding computational component or the corresponding software component based on the functional logs; generate operational data for the corresponding computational component or the corresponding software component based on the operational logs; generate KPIs for the corresponding computational component or the corresponding software component based on the functional logs and operational logs; and provide the functional data, the operational data, and the KPIs for the corresponding computational component or the corresponding software component to the central digital twin.

As further shown in FIG. 4, process 400 may include creating, via the central digital twin, complex KPIs based on the functional data, the operational data, and the KPIs received from the digital twins (block 440). For example, the device may create, via the central digital twin, complex KPIs based on the functional data, the operational data, and the KPIs received from the digital twins, as described above. In some implementations, creating the complex KPIs based on the functional data, the operational data, and the KPIs includes performing mathematical and logical operations on the functional data, the operational data, and the KPIs to create the complex KPIs.

As further shown in FIG. 4, process 400 may include modifying, via the central digital twin and based on the complex KPIs, one or more of the digital twins to generate additional KPIs (block 450). For example, the device may modify, via the central digital twin and based on the complex KPIs, one or more of the digital twins to generate additional KPIs, as described above. In some implementations, modifying, based on the complex KPIs, the one or more of the digital twins to generate the additional KPIs includes performing initial analytics on the one or more digital twins, performing additional analytics on the one or more digital twins based on the initial analytics, performing initial corrective actions based on additional analytics, and causing the one or more of the digital twins to generate the additional KPIs based on performing the initial corrective actions.

As further shown in FIG. 4, process 400 may include processing, via the central digital twin, the additional KPIs, with a trained principal component analysis model, to detect one or more first anomalies in the distributed and heterogeneous system (block 460). For example, the device may process, via the central digital twin, the additional KPIs, with a trained principal component analysis model, to detect one or more first anomalies in the distributed and heterogeneous system, as described above. In some implementations, processing the additional KPIs, with the trained principal component analysis model, to detect the one or more first anomalies in the distributed and heterogeneous system includes calculating a reconstruction error associated with the additional KPIs, determining whether the reconstruction error satisfies a threshold, and detecting the one or more first anomalies in the distributed and heterogeneous system based on the reconstruction error failing to satisfy the threshold.

As further shown in FIG. 4, process 400 may include processing, via the central digital twin, the additional KPIs, with a trained self-organizing maps model, to detect one or more second anomalies in the distributed and heterogeneous system (block 470). For example, the device may process, via the central digital twin, the additional KPIs, with a trained self-organizing maps model, to detect one or more second anomalies in the distributed and heterogeneous system, as described above. In some implementations, processing the additional KPIs, with the trained self-organizing maps model, to detect the one or more second anomalies in the distributed and heterogeneous system includes identifying a best matching unit associated with the additional KPIs, identifying, in the additional KPIs, a neighbor of the best matching unit, calculating a neighborhood size of the best matching unit, determining whether the neighborhood size of the best matching unit satisfies a threshold, and detecting the one or more second anomalies in the distributed and heterogeneous system based on the neighborhood size of the best matching unit failing to satisfy the threshold. In some implementations, the trained self-organizing maps model is trained to define non-anomalous behavior in the distributed and heterogeneous system.

As further shown in FIG. 4, process 400 may include generating, via the central digital twin and based on the one or more first anomalies and the one or more second anomalies, a KPI cause vector identifying a root cause associated with the one or more first anomalies and the one or more second anomalies (block 480). For example, the device may generate, via the central digital twin and based on the one or more first anomalies and the one or more second anomalies, a KPI cause vector identifying a root cause associated with the one or more first anomalies and the one or more second anomalies, as described above. In some implementations, generating, based on the one or more first anomalies and the one or more second anomalies, the KPI cause vector identifying the root cause includes comparing the KPI cause vector with a plurality of KPI cause vectors associated with corresponding root causes, and identifying one of the corresponding causes as the root cause based on comparing the KPI cause vector with the plurality of KPI cause vectors associated with the corresponding root causes. In some implementations, the KPI cause vector is a vector representation indicating which of the additional KPIs are responsible for the one or more first anomalies and the one or more second anomalies. In some implementations, the device may iteratively generate the KPI cause vector to generate a finer level of root cause detection. For example, at a first level, the device may detect that a server is overloaded with requests. The device may identify a cause of the first level "server overload" to be either a natural spike in traffic, a denial of service (DoS) attack, a traffic redirection, and/or the like.

As further shown in FIG. 4, process 400 may include performing one or more actions based on the root cause (block 490). For example, the device may perform one or more actions based on the root cause, as described above. In some implementations, performing the one or more actions includes one or more of reconfiguring a load balancer and an auto scaler associated with the distributed and heterogeneous system, or correcting a network slowdown associated with the distributed and heterogeneous system. In some implementations, performing the one or more actions includes one or more of correcting network errors associated with the distributed and heterogeneous system, correcting a software issue of an edge device associated with the distributed and heterogeneous system, or correcting a software issue of a cloud device associated with the distributed and heterogeneous system.

In some implementations, process 400 includes receiving the functional data, the operational data, and the KPIs from the digital twins.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, system data identifying computational components and software components of a distributed and heterogeneous system executing a hybrid cloud application;
   creating, by the device, digital twins for the computational components and the software components of the distributed and heterogeneous system;
   creating, by the device, a central digital twin to receive functional data, operational data, and key performance indicators (KPIs) from the digital twins;
   creating, by the device and via the central digital twin, complex KPIs based on the functional data, the operational data, and the KPIs received from the digital twins;
   modifying, by the device, via the central digital twin, and based on the complex KPIs, one or more of the digital twins to generate additional KPIs;
   processing, by the device and via the central digital twin, the additional KPIs, with a trained principal component analysis model, to detect one or more first anomalies in the distributed and heterogeneous system;
   processing, by the device and via the central digital twin, the additional KPIs, with a trained self-organizing maps model, to detect one or more second anomalies in the distributed and heterogeneous system;
   generating, by the device, via the central digital twin, and based on the one or more first anomalies and the one or more second anomalies, a KPI cause vector identifying a root cause associated with the one or more first anomalies and the one or more second anomalies; and
   performing, by the device, one or more actions based on the root cause.

2. The method of claim 1, wherein the system data includes data identifying one or more of:
   functional data associated with the computational components of the distributed and heterogeneous system;
   operational data associated with the computational components of the distributed and heterogeneous system;
   functional data associated with the software components of the distributed and heterogeneous system; and operational data associated with the software components of the distributed and heterogeneous system.

3. The method of claim 1, further comprising:
receiving the functional data, the operational data, and the KPIs from the digital twins.

4. The method of claim 1, wherein each of the digital twins is configured to:
collect functional logs and operational logs associated with a corresponding computational component or a corresponding software component;
generate functional data for the corresponding computational component or the corresponding software component based on the functional logs;
generate operational data for the corresponding computational component or the corresponding software component based on the operational logs;
generate KPIs for the corresponding computational component or the corresponding software component based on the functional logs and operational logs; and
provide the functional data, the operational data, and the KPIs for the corresponding computational component or the corresponding software component to the central digital twin.

5. The method of claim 1, wherein creating the complex KPIs based on the functional data, the operational data, and the KPIs comprises:
performing mathematical and logical operations on the functional data, the operational data, and the KPIs to create the complex KPIs.

6. The method of claim 1, wherein modifying, based on the complex KPIs, the one or more of the digital twins to generate the additional KPIs comprises:
performing initial analytics on the one or more digital twins;
performing additional analytics on the one or more digital twins based on the initial analytics;
performing initial corrective actions based on additional analytics; and
causing the one or more of the digital twins to generate the additional KPIs based on performing the initial corrective actions.

7. The method of claim 1, wherein processing the additional KPIs, with the trained principal component analysis model, to detect the one or more first anomalies in the distributed and heterogeneous system comprises:
calculating a reconstruction error associated with the additional KPIs;
determining whether the reconstruction error satisfies a threshold; and
detecting the one or more first anomalies in the distributed and heterogeneous system based on the reconstruction error failing to satisfy the threshold.

8. A device, comprising:
one or more memories; and
one or more processors, coupled to the one or more memories, configured to:
receive system data identifying computational components and software components of a distributed and heterogeneous system executing a hybrid cloud application;
create digital twins for the computational components and the software components of the distributed and heterogeneous system;
create a central digital twin;
receive, via the central digital twin, functional data, operational data, and key performance indicators (KPIs) from the digital twins;

create, via the central digital twin, complex KPIs based on the functional data, the operational data, and the KPIs received from the digital twins;
modify, via the central digital twin and based on the complex KPIs, one or more of the digital twins to generate additional KPIs;
process, via the central digital twin, the additional KPIs, with a trained principal component analysis model, to detect one or more first anomalies in the distributed and heterogeneous system;
process, via the central digital twin, the additional KPIs, with a trained self-organizing maps model, to detect one or more second anomalies in the distributed and heterogeneous system;
generate, via the central digital twin and based on the one or more first anomalies and the one or more second anomalies, a KPI cause vector identifying a root cause associated with the one or more first anomalies and the one or more second anomalies; and
perform one or more actions based on the root cause.

9. The device of claim 8, wherein the one or more processors, to process the additional KPIs, with the trained self-organizing maps model, to detect the one or more second anomalies in the distributed and heterogeneous system, are configured to:
identify a best matching unit associated with the additional KPIs;
identify, in the additional KPIs, a neighbor of the best matching unit;
calculate a neighborhood size of the best matching unit;
determine whether the neighborhood size of the best matching unit satisfies a threshold; and
detect the one or more second anomalies in the distributed and heterogeneous system based on the neighborhood size of the best matching unit failing to satisfy the threshold.

10. The device of claim 8, wherein the trained self-organizing maps model is trained to define non-anomalous behavior in the distributed and heterogeneous system.

11. The device of claim 8, wherein the one or more processors, to generate, based on the one or more first anomalies and the one or more second anomalies, the KPI cause vector identifying the root cause, are configured to:
compare the KPI cause vector with a plurality of KPI cause vectors associated with corresponding root causes; and
identify one of the corresponding causes as the root cause based on comparing the KPI cause vector with the plurality of KPI cause vectors associated with the corresponding root causes.

12. The device of claim 8, wherein the KPI cause vector is a vector representation indicating which of the additional KPIs are responsible for the one or more first anomalies and the one or more second anomalies.

13. The device of claim 8, wherein the one or more processors, to perform the one or more actions, are configured to one or more of:
reconfigure a load balancer and an auto scaler associated with the distributed and heterogeneous system; or
correct a network slowdown associated with the distributed and heterogeneous system.

14. The device of claim 8, wherein the one or more processors, to perform the one or more actions, are configured to one or more of:
correct network errors associated with the distributed and heterogeneous system;

correct a software issue of an edge device associated with the distributed and heterogeneous system; or correct a software issue of a cloud device associated with the distributed and heterogeneous system.

15. A non-transitory computer-readable medium storing a set of instructions, the set of instructions comprising:

one or more instructions that, when executed by one or more processors of a device, cause the device to:

receive system data identifying computational components and software components of a distributed and heterogeneous system executing a hybrid cloud application;

create digital twins for the computational components and the software components of the distributed and heterogeneous system;

create a central digital twin to receive functional data, operational data, and key performance indicators (KPIs) from the digital twins;

create, via the central digital twin, complex KPIs based on the functional data, the operational data, and the KPIs received from the digital twins;

modify via the central digital twin, and based on the complex KPIs, one or more of the digital twins to generate additional KPIs;

process, via the central digital twin, the additional KPIs, with a trained principal component analysis model, to detect one or more first anomalies in the distributed and heterogeneous system;

process, via the central digital twin, the additional KPIs, with a trained self-organizing maps model, to detect one or more second anomalies in the distributed and heterogeneous system;

generate via the central digital twin, and based on the one or more first anomalies and the one or more second anomalies, a KPI cause vector identifying a root cause associated with the one or more first anomalies and the one or more second anomalies; and perform one or more actions based on the root cause.

16. The non-transitory computer-readable medium of claim 15, wherein the one or more instructions, that cause the device to create the complex KPIs based on the functional data, the operational data, and the KPIs, cause the device to:

perform mathematical and logical operations on the functional data, the operational data, and the KPIs to create the complex KPIs.

17. The non-transitory computer-readable medium of claim 15, wherein the one or more instructions, that cause the device to modify, based on the complex KPIs, the one or more of the digital twins to generate the additional KPIs, cause the device to:

perform initial analytics on the one or more digital twins;

perform additional analytics on the one or more digital twins based on the initial analytics;

perform initial corrective actions based on additional analytics; and cause the one or more of the digital twins to generate the additional KPIs based on performing the initial corrective actions.

18. The non-transitory computer-readable medium of claim 15, wherein the one or more instructions, that cause the device to process the additional KPIs, with the trained principal component analysis model, to detect the one or more first anomalies in the distributed and heterogeneous system, cause the device to:

calculate a reconstruction error associated with the additional KPIs;

determine whether the reconstruction error satisfies a threshold; and detect the one or more first anomalies in the distributed and heterogeneous system based on the reconstruction error failing to satisfy the threshold.

19. The non-transitory computer-readable medium of claim 15, wherein the one or more instructions, that cause the device to process the additional KPIs, with the trained self-organizing maps model, to detect the one or more second anomalies in the distributed and heterogeneous system, cause the device to:

identify a best matching unit associated with the additional KPIs;

identify, in the additional KPIs, a neighbor of the best matching unit;

calculate a neighborhood size of the best matching unit;

determine whether the neighborhood size of the best matching unit satisfies a threshold; and detect the one or more second anomalies in the distributed and heterogeneous system based on the neighborhood size of the best matching unit failing to satisfy the threshold.

20. The non-transitory computer-readable medium of claim 15, wherein the one or more instructions, that cause the device to generate, based on the one or more first anomalies and the one or more second anomalies, the KPI cause vector identifying the root cause, cause the device to:

compare the KPI cause vector with a plurality of KPI cause vectors associated with corresponding root causes; and identify one of the corresponding causes as the root cause based on comparing the KPI cause vector with the plurality of KPI cause vectors associated with the corresponding root causes.

* * * * *